United States Patent [19]

Segal

[11] Patent Number: 5,781,530
[45] Date of Patent: Jul. 14, 1998

[54] REDUNDANT LOCAL AREA NETWORK

[75] Inventor: Niranjan Nath Segal, Arlington, Tex.

[73] Assignee: Motorola, Inc.

[21] Appl. No.: 627,719

[22] Filed: Apr. 1, 1996

[51] Int. Cl.$^6$ .................................................. H04L 1/22
[52] U.S. Cl. .......................................... 370/220; 370/244
[58] Field of Search .................................... 370/219, 220, 370/223, 225, 227, 228, 445, 446, 242, 244, 245

[56] References Cited

U.S. PATENT DOCUMENTS

| | | | |
|---|---|---|---|
| 5,051,740 | 9/1991 | Barr | 340/825.44 |
| 5,200,950 | 4/1993 | Foglar et al. | 370/219 |
| 5,365,511 | 11/1994 | Kusano | 370/220 |
| 5,488,606 | 1/1996 | Kakuma et al. | 370/219 |
| 5,521,913 | 5/1996 | Gridley | 370/389 |
| 5,526,353 | 6/1996 | Henley et al. | 370/392 |
| 5,544,163 | 8/1996 | Madonna . | |
| 5,594,702 | 1/1997 | Wakeman et al. | 365/230.05 |

Primary Examiner—Douglas W. Olms
Assistant Examiner—Min Jung
Attorney, Agent, or Firm—R. Louis Breeden

[57] ABSTRACT

A control system (101) is utilized by a radio communication system for communicating with selective call transceivers (102). The control system (101) includes an input interface (114) for receiving a message from a user, a processing system (111) for processing and storing the message, and a local area network (LAN) for controlling a transmitter system (105) for transmitting the message. The LAN has an architecture providing communication redundancy. The LAN includes at least one data communication path (118) for linking data communications to and from at least one data communication device (112, 114). The LAN further includes a first and second ethernet switch (108, 109) coupled to a first and second end (120, 122) of the at least one data communication path (118) for routing the data communications thereto and therefrom. The processing system (111) is coupled to the ethernet switches (108, 109) for transmitting and receiving the data communications.

15 Claims, 4 Drawing Sheets

REDUNDANT LOCAL AREA NETWORK

FIELD OF THE INVENTION

This invention relates in general to local area networks, and more specifically to a local area network having an architecture for providing communication redundancy.

BACKGROUND OF THE INVENTION

The local area network (LAN) has been used for providing data communications between various data communication devices. A common application for the LAN is to provide data communications between a server and a plurality of client computers and terminals that need to access the server's database. Another application for the LAN is to connect a processing system with peripheral devices controlled by the processing system.

Whenever high availability is required, redundancy has been incorporated into the LAN to reduce the probability of interruption of the data communications. A prior art approach to LAN redundancy has been to provide two or more LANs, each having a LAN controller coupled thereto and coupled to a data communication device. Software is required in the data communication devices to switch between the LAN controllers when a failure occurs in an active one of the LANs. This approach has proven to be costly and difficult—especially when using off-the-shelf data communication devices having built-in LAN controller drivers.

Thus, what is needed is an inexpensive and less difficult approach to LAN redundancy. In particular, it would be highly desirable if the inventive approach could be applied to off-the-shelf data communication devices without requiring significant modification of the hardware or software thereof. Ideally, the inventive approach should allow the LAN to operate without an interruption, following a single failure anywhere in the LAN system.

SUMMARY OF THE INVENTION

An aspect of the present invention is a local area network (LAN) having an architecture for providing communication redundancy. The LAN comprises at least one data communication path for linking data communications to and from at least one data communication device. The LAN further comprises a first intelligent data routing switch coupled to a first end of the at least one data communication path for routing the data communications thereto and therefrom, a second intelligent data routing switch coupled to a second end of the at least one data communication path for routing the data communications thereto and therefrom, and a processing system coupled to the first and second intelligent data routing switches for transmitting and receiving the data communications.

Another aspect of the present invention is a control system for a radio communication system. The control system comprises an input interface for receiving a message from a user, a processing system coupled to the input interface for processing and storing the message, and a local area network (LAN) coupled to the processing system for controlling a transmitter system for transmitting the message, the LAN having an architecture for providing communication redundancy. The LAN comprises at least one data communication path for linking data communications comprising the message to and from at least one data communication device. The LAN further comprises a first intelligent data routing switch coupled to a first end of the at least one data communication path for routing the data communications thereto and therefrom, and a second intelligent data routing switch coupled to a second end of the at least one data communication path for routing the data communications thereto and therefrom. The processing system is coupled to the first and second intelligent data routing switches for transmitting and receiving the data communications.

DESCRIPTION OF THE PREFERRED EMBODIMENT

Figure 1:
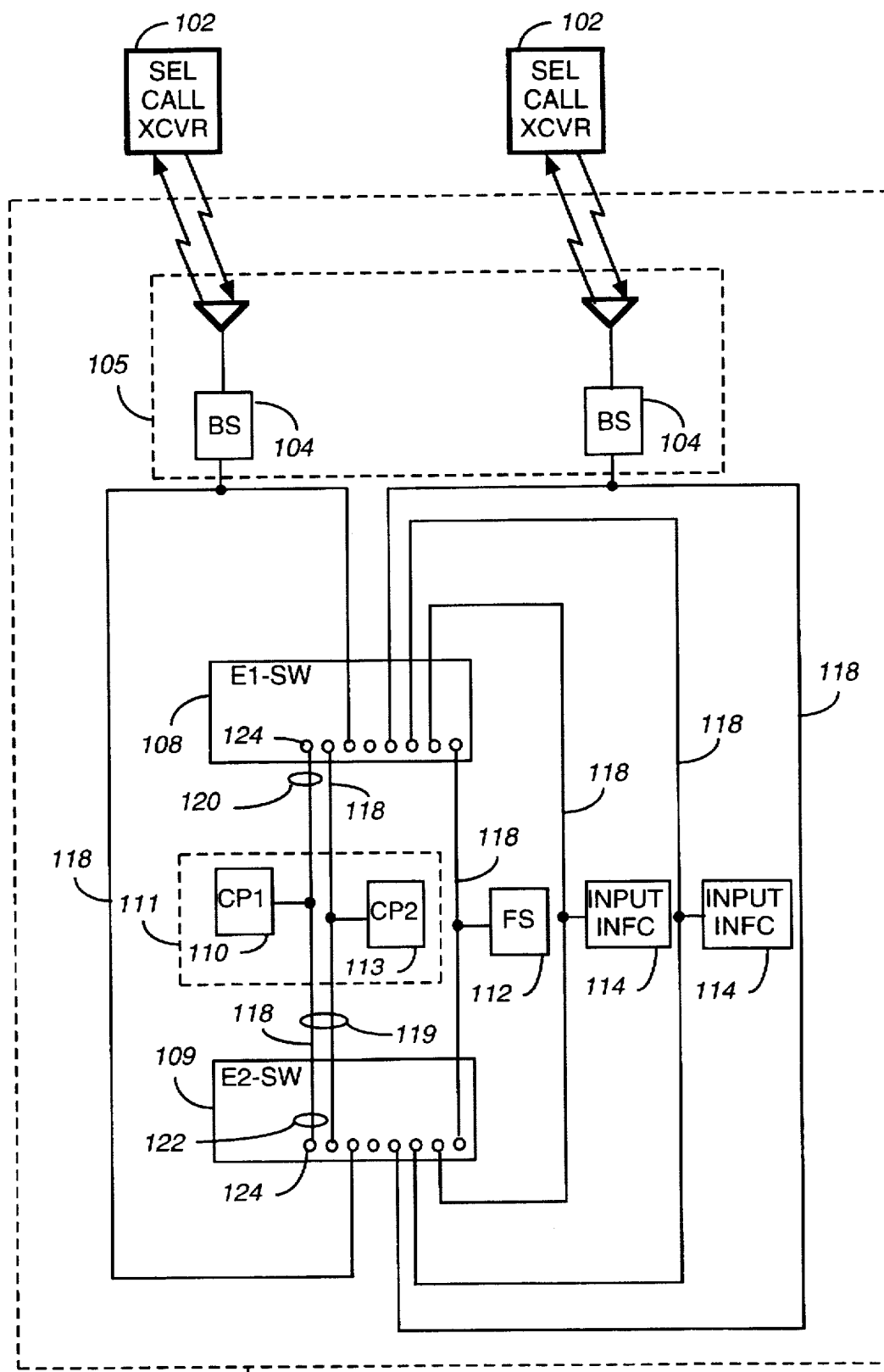
FIG. 1 is an electrical block diagram of a radio communication system in accordance with the preferred embodiment of the present invention.

FIG. 1 is an electrical block diagram of a radio communication system in accordance with the preferred embodiment of the present invention. The radio communication system comprises a control system 101 and a plurality of conventional selective call transceivers 102. The control system includes a processing system 111, input interfaces 114, and a local area network (LAN) for relaying messages to and from elements in the control system 101.

The input interfaces 114 are conventional input interfaces used for receiving messages from a user. Users utilize, for example, a conventional telephone coupled to a public switched telephone network (PSTN) for sending messages to the input interfaces 114. The processing system 111 is a conventional processing system coupled to the input interfaces 114 for processing and storing messages received from the input interfaces 114. The LAN is coupled to the processing system 111 for controlling a transmitter system 105, which includes two conventional base stations 104, for transmitting messages to the plurality of selective call transceivers 102. The novel architecture of the LAN provides communication redundancy throughout all interconnects of the control system 101.

The LAN comprises at least one data communication path 118 for linking data communications comprising messages to and from at least one data communication device such as, for example, the processing system 111 and the transmitter system 105. The at least one data communication path 118 is preferably an ethernet link, and preferably comprises at least two data communication paths 119. The LAN further includes a first intelligent data routing switch (a first ethernet switch) 108 coupled to a first end 120 of the at least one data communication path 118 for routing the data communications thereto and therefrom, and a second intelligent data routing switch (a second ethernet switch) 109 coupled to a second end 122 of the at least one data communication path 118 for routing the data communications thereto and therefrom.

The processing system 111 is coupled to the first and second ethernet switches 108, 109 for transmitting and receiving the data communications. The LAN further comprises a plurality of external terminators 124 coupled to ports of the first and second ethernet switches 108, 109. The external terminators 124 provide a correct terminating impedance as required for each end of each LAN segment. As the external terminators 124 are independent of the first and second ethernet switches 108, 109 and the power supplies thereof, LAN communications advantageously are not disrupted by a failure or shutdown of one of the first and second ethernet switches 108, 109, as will be discussed in greater detail below.

The first and second ends 120, 122 of the at least one data communication path 118 each terminate at a port of the first and second ethernet switches 108, 109. As referred to herein below, the ports at which a common data communication path 118 terminates are "corresponding" ports.

The processing system 111 comprises a conventional first processor (CP1) 110 and a conventional second processor (CP2) 113 both coupled to the first and second ethernet switches 108, 109, respectively. The first and second ethernet switches 108, 109 are arranged such that they continue to route all the data communications to and from the first and second processors 110, 113 after a failure of an active port in one of the first and second intelligent data routing switches, the failure lasting beyond a predetermined time period.

The first ethernet switch 108 is pre-programmed to route a first portion of the data communications to a first portion of the at least two data communication paths 119. Similarly, the second ethernet switch 109 is pre-programmed to route a second portion of the data communications to a second portion of the at least two data communication paths 119.

The first and second ethernet switches 108, 109 are programmed to periodically communicate with one another such that a communicating one of the first and second ethernet switches 108, 109 routes all the data communications between the processing system 111 and the at least one data communication path 118, in response to an absence of communications from a non-communicating one of the first and second ethernet switches 108, 109, the absence lasting beyond a predetermined time period.

The first and second ethernet switches 108, 109 are further programmed to prevent a duplicate routing of the data communications to the at least one data communication path 118 by communicating routing information between one another, and executing an algorithm such as, for example, a spanning tree algorithm, that utilizes the routing information to prevent the duplicate routing.

Figure 2:
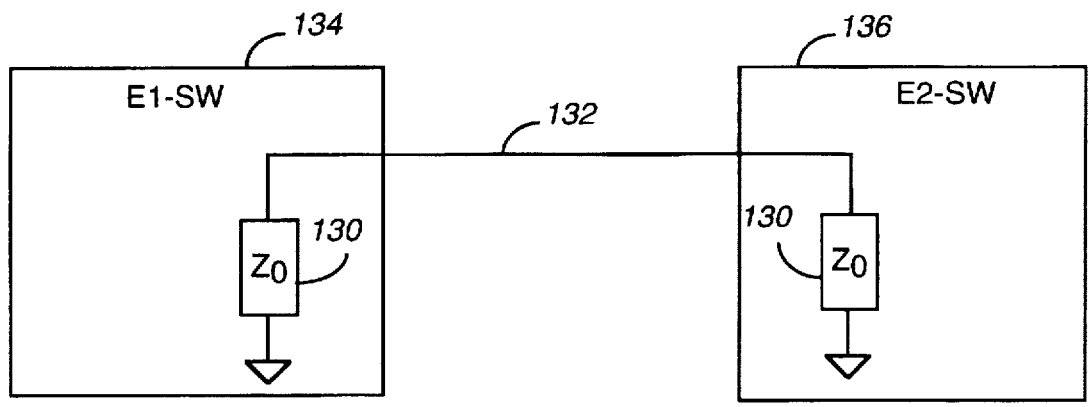
FIG. 2 is an electrical block diagram of prior art ethernet switch terminations.

FIG. 2 is an electrical block diagram of prior art ethernet switch terminations. This diagram comprises two prior art ethernet switches 134, 136, a data path 132, and internal terminations 130. Prior art ethernet switches such as these utilize internal terminations 130. The internal terminations 130 comprise conventional active filters that are powered by the internal power supply of the prior art ethernet switches 134, 136. Thus, when the prior art ethernet switches 134, 136 are powered down, the internal terminations 130 are powered down as well. This aspect of the prior art ethernet switches 134, 136 restricts the ability for creating redundancy in the manner depicted in FIG. 1, because the failure or removal of one switch breaks the terminations of other switches coupled to the same data path, thereby disrupting all communications. Prior to the present invention, the internal terminations 130 were not deemed to present any problem, because apparently no one had considered the utilization of ethernet switches, uniquely arranged as depicted in FIG. 1, for creating a fully redundant LAN.

Figure 3:
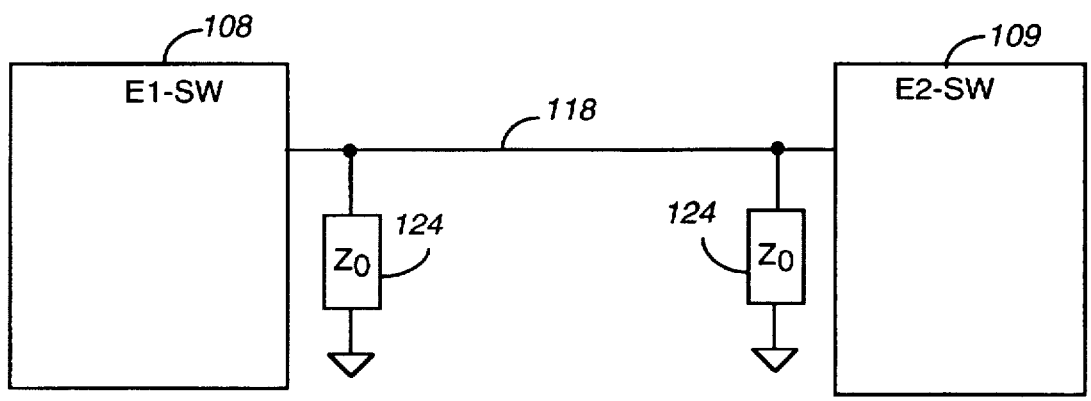
FIG. 3 is an electrical block diagram of ethernet switch terminations in accordance with the preferred embodiment of the present invention.

An aspect of the present invention, as illustrated in FIG. 3, resolves the above described limitations of the prior art ethernet switches 134, 136. FIG. 3 is an electrical block diagram depicting external ethernet switch terminations 124 in accordance with the preferred embodiment of the present invention. The diagram includes the first and second ethernet switches 108, 109 of FIG. 1. Note that the internal terminations 130 utilized in the prior art ethernet switches 134, 136 have been removed. The diagram depicts the external ethernet terminations 124 coupled to both ends of the at least one data communication path 118. The external terminations 124 are passive ethernet terminations. Since the external terminations 124 are passive they do not depend on the internal power supply of the first and second ethernet switches 108, 109. Thus, the failure, removal for servicing, or power down of one switch does not cause a fault on the other switch, and communication on the at least one data communication path 118 can continue unabated, for example, between the processing system 111 and the LAN segments coupled through the other (operational) switch.

Figure 4:
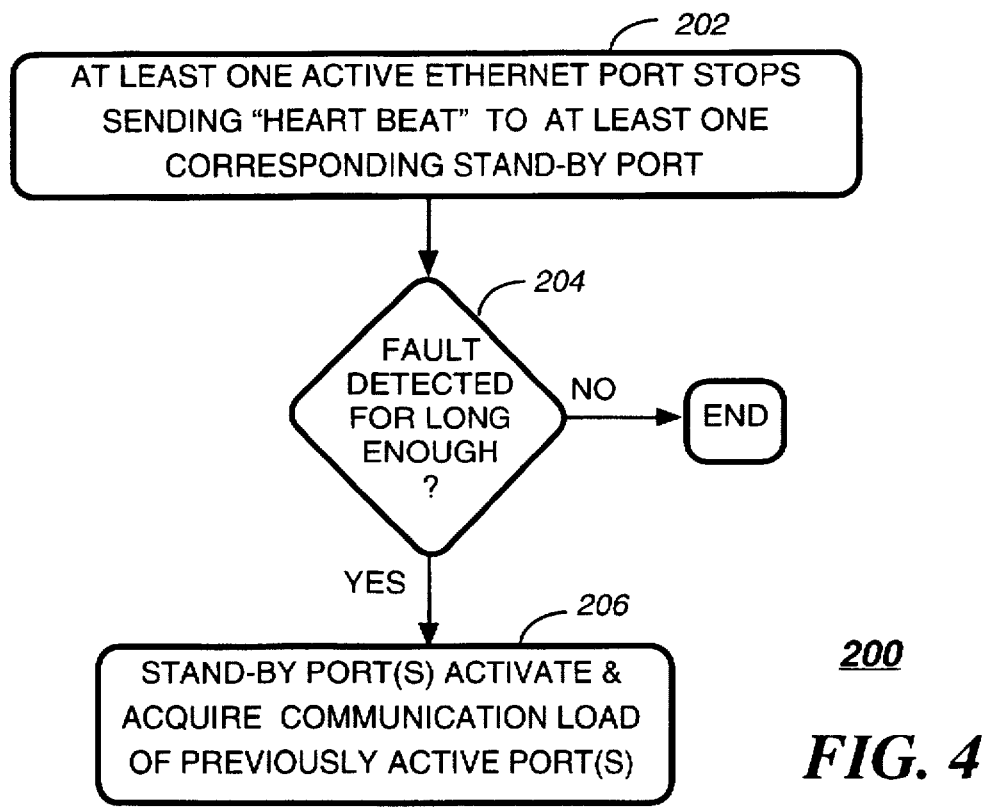
FIG. 4 is a flow chart depicting the operation of the first and second ethernet switches in accordance with the preferred embodiment of the present invention.

FIG. 4 is a flow chart 200 depicting the operation of the first and second ethernet switches 108, 109 in accordance with the preferred embodiment of the present invention. The flow chart 200 begins with step 202 where at least one active ethernet switch port stops sending a periodic "heart beat" message to at least one corresponding stand-by ethernet switch port. This "heart beat" message is intended to provide a method for ethernet switch ports coupled together to monitor each other's status. Thus, when a stand-by ethernet switch port fails to detect the periodic "heart beat" message from a previously active corresponding ethernet switch port, the stand-by ethernet switch port takes action to cure the communication problem. Preferably, in such situations the stand-by ethernet switch port assumes the routing of all messages normally routed by the corresponding previously active ethernet switch port.

In step 204 the stand-by ethernet switch port checks for a fault, which is defined as a lack of the periodic "heart beat" message from the corresponding active ethernet switch port. If the fault is detected for longer than a predetermined time, the stand-by ethernet switch port proceeds to step 206 where it becomes active and assumes the data communication load of the previously active corresponding ethernet switch port. If, on the other hand, the fault goes away soon enough, the process ends without the stand-by port becoming active. This method of designating only one of each pair of corresponding ports to be "active" at any given time follows, for example, the spanning tree algorithm which routes information in a manner that prevents duplicate routing of messages.

Figure 5:
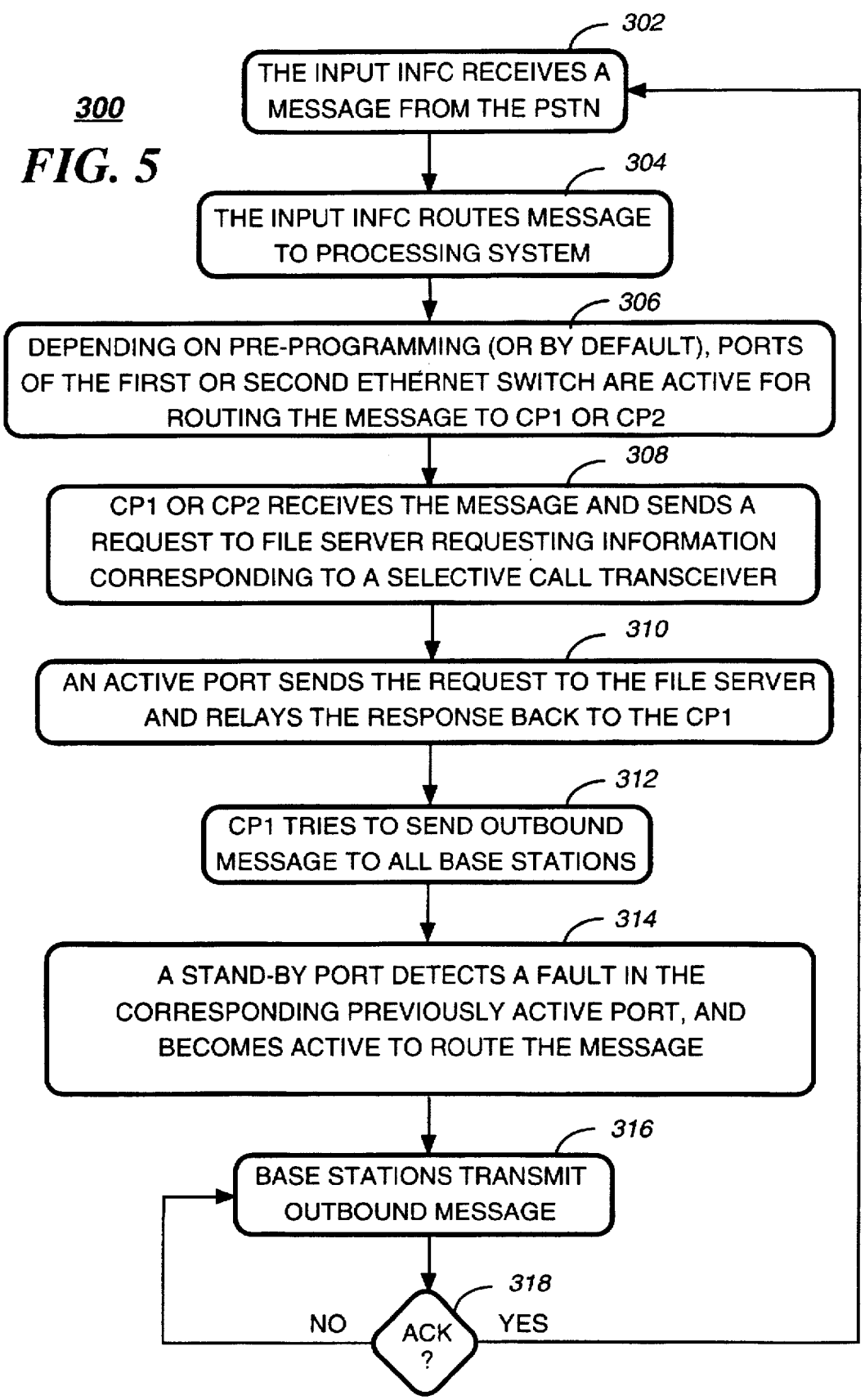
FIG. 5 is a flow chart depicting an example of the operation of the radio communication system in accordance with the preferred embodiment of the present invention.

FIG. 5 is a flow chart 300 depicting an example of the operation of the radio communication system of FIG. 1 in accordance with the preferred embodiment of the present invention. The flow chart 300 begins with step 302 where the input interface 114 receives a message from the PSTN. In step 304 the input interface 114 routes the message to the processing system 111. Depending on pre-programmed routing instructions in the first and second ethernet switches 108, 109, the first ethernet switch 108, for example, routes the message to one of the central processors 110, 113 (in this example, the first central processor 110) in step 306. In step 308 the first central processor 110 receives the message, and sends a request to the file server 112 requesting information corresponding to a selective call transceiver 102.

In step 310 an active port sends the request to the file server 112 and relays the response back to the first central processor 110. In step 312 the first central processor 110 processes the received message in a conventional manner to create an outbound message. Once created, the first processor 110 tries to send the outbound message to the base stations 104 for subsequent transmission to the intended selective call transceiver 102. In this example, an active port is pre-programmed to route communications between the first central processor 110 and the base stations 104, under normal operational circumstances. In step 314, however, a stand-by port corresponding to the active port detects a prolonged fault in the active port.

This fault can occur from several sources such as, for example, a hardware failure in the active port, a discontinuity on one of the at least one data communication paths 118, or a power shutdown of the ethernet switch 108, 109 containing the active port. In this instance, the stand-by ethernet switch port will assume the routing responsibilities normally handled by the previously active ethernet switch port and will send the outbound message. This communication is possible because a fault in either of the first and second ethernet switches 108, 109 does not affect the integrity of the data communication paths 118. In step 316 the base stations 104 transmit the outbound message. In step 318 the base stations 104 await an acknowledgment message (ACK) from the selective call transceiver 102. If no response is received, the base stations 104 are, for example, programmed to retransmit the outbound message. When an ACK arrives, the radio communication system continues operation from step 302.

Preferably, the assumption of communication routing responsibilities by stand-by ports is performed on a port-by-port basis. It will be appreciated that, alternatively, all of the ports of one of the ethernet switches 108, 109 can be active ports, while all of the ports of the remaining ethernet switch 108, 109 can be stand-by ports. Then in the event of a failure of the ethernet switch containing the active ports, all of the ports of the ethernet switch containing the stand-by ports can be changed to active ports for assuming the communication routing responsibilities. It will also be appreciated that it is possible to pre-program selected ones of the ports of the first and second ethernet switches 108, 109 to be active, while the remainder are stand-by. For example, one-half the ports of either ethernet switch can be programmed to be active for load sharing purposes, if desired.

Figure 6:
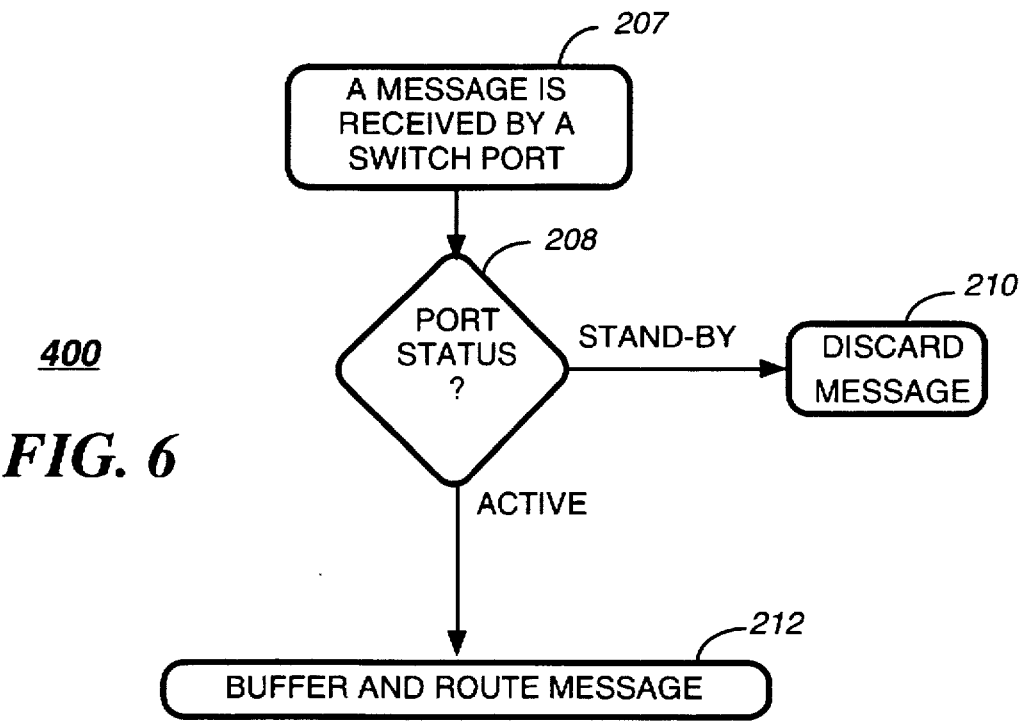
FIG. 6 is a flow chart depicting operation of one of the ethernet switch ports in response to receiving a message.

FIG. 6 is a flow chart 400 depicting operation of one of the ethernet switch ports in response to receiving a message. In step 207 one of the ethernet switch ports receives an incoming message. Then in step 208 the ethernet switch 108, 109 receiving the message checks the status of the port which received the message. If the port status is "stand-by," then the ethernet switch 108, 109 discards the message in step 210. Otherwise, the ethernet switch 108, 109 proceeds to step 212 where it buffers and routes the received message.

Thus, it should be apparent by now that the present invention provides a simple and inexpensive approach to LAN redundancy. In particular, the preferred embodiment in accordance with the invention advantageously utilizes off-the-shelf data communication devices, connected in a unique manner to provide a novel, fully redundant architecture, without requiring extensive modification of the hardware or software of the data communication devices. The inventive approach further allows the LAN to operate without an interruption, following a single failure anywhere in the LAN system.

What is claimed is:

1. A local area network (LAN) having an architecture for providing communication redundancy, the LAN comprising:

at least two data communication paths for linking data communications between at least two data communication devices, a data communication path having a first end coupled to a port of a first intelligent data routing switch and a second end coupled to a port of a second intelligent data routing switch, the data communication path also coupled to a data communication device at a point between the first and second ends;

the first intelligent data routing switch, comprising a first plurality of ports;

the second intelligent data routing switch, comprising a second plurality of ports; and the at least two data communication devices, wherein the first and second intelligent data routing switches are programmed such that both the first and second intelligent data routing switches do not simultaneously route the data communications of a data communication path.

2. The LAN of claim 1, further comprising a plurality of external terminators coupled to ports of the first and second intelligent data routing switches.

3. The LAN of claim 1, wherein at least one of the at least two data communication devices comprises a processing system, and wherein the processing system comprises:
 a first processor coupled to a first corresponding pair of ports of the first and second pluralities of ports; and
 a second processor coupled to a second corresponding pair of ports of the first and second pluralities of ports, and wherein the first and second intelligent data routing switches are programmed such that a first port of each of the first and second corresponding pairs of ports is a normally active port, while a second port of each of the first and second corresponding pairs of ports is a stand-by port, and wherein the first and second data routing switches are further programmed such that the stand-by port of one of the first and second corresponding pairs of ports is activated for routing the data communications after a failure of the normally active port of the one of the first and second corresponding pairs of ports, the failure lasting beyond a predetermined time period.

4. The LAN of claim 1, wherein the first intelligent data routing switch is programmed to be active to route all the data communications between the at least two data communication paths, and wherein the second intelligent data routing switch is programmed to be a stand-by switch to route all the data communications between the at least two data communication paths upon a failure of the first intelligent data routing switch.

5. The LAN of claim 1, wherein a corresponding pair of ports of the first and second intelligent data routing switches send a periodic communication to one another, and wherein the first and second intelligent data routing switches are programmed such that a first port of the corresponding pair of ports routes the data communications when both ports of the corresponding pair of ports are operational, and such that a second port of the corresponding pair of ports routes the data communications, in response to an absence of the periodic communication from the first port of the corresponding pair of ports, the absence lasting beyond a predetermined time period.

6. The LAN of claim 1,
wherein the at least two data communication paths comprise ethernet links, and
wherein the first and second intelligent data routing switches are ethernet switches.

7. The LAN of claim 1, wherein the first and second intelligent data routing switches are programmed to prevent a duplicate routing of the data communications by communicating routing information between one another and then executing a spanning tree algorithm on the routing information to prevent any duplicate routes.

8. The LAN of claim 1, wherein at least one of the at least two data communication devices comprises a processing system.

9. A control system for a radio communication system, the control system comprising:
   an input interface for receiving a message from a user;
   a processing system coupled to the input interface for processing and storing the message; and
   a local area network (LAN) coupled to the processing system, the LAN for providing communications between the processing system and a transmitter system for transmitting the message, the LAN having an architecture for providing communication redundancy, the LAN comprising:
      at least two data communication paths for linking data communications comprising the message between the processing system and a data communication device, a data communication path having a first end coupled to a port of a first intelligent data routing switch and a second end coupled to a port of a second intelligent data routing switch, the data communication path also coupled at a point between the first and second ends to one of (a) the processing system, and (b) the data communication device;
      the first intelligent data routing switch, comprising a first plurality of ports;
      the second intelligent data routing switch, comprising a second plurality of ports; and
      the data communication device,
      wherein the first and second intelligent data routing switches are programmed such that both the first and second intelligent data routing switches do not simultaneously route the data communications of a data communication path.

10. The control system of claim 9, further comprising a plurality of external terminators coupled to ports of the first and second intelligent data routing switches.

11. The control system of claim 9,
wherein the processing system comprises:
   a first processor coupled to a first corresponding pair of ports of the first and second pluralities of ports; and
   a second processor coupled to a second corresponding pair of ports of the first and second pluralities of ports, and
wherein the first and second intelligent data routing switches are programmed such that a first port of each of the first and second corresponding pairs of ports is a normally active port, while a second port of each of the first and second corresponding pairs of ports is a stand-by port, and wherein the first and second data routing switches are further programmed such that the stand-by port of one of the first and second corresponding pairs of ports is activated for routing the data communications after a failure of the normally active port of the one of the first and second corresponding pairs of ports, the failure lasting beyond a predetermined time period.

12. The control system of claim 9,
wherein the first intelligent data routing switch is programmed to be active to route all the data communications between the at least two data communication paths, and
wherein the second intelligent data routing switch is programmed to be a stand-by switch to route all the data communications between the at least two data communication paths upon a failure of the first intelligent data routing switch.

13. The control system of claim 9,
wherein a corresponding pair of ports of the first and second intelligent data routing switches send a periodic communication to one another, and
wherein the first and second intelligent data routing switches are programmed such that a first port of the corresponding pair of ports routes the data communications when both ports of the corresponding pair of ports are operational, and such that a second port of the corresponding pair of ports routes the data communications, in response to an absence of the periodic communication from the first port of the corresponding pair of ports, the absence lasting beyond a predetermined time period.

14. The control system of claim 9,
wherein the at least two data communication paths comprise ethernet links, and
wherein the first and second intelligent data routing switches are ethernet switches.

15. The control system of claim 9, wherein the first and second intelligent data routing switches are programmed to prevent a duplicate routing of the data communications by communicating routing information between one another and then executing a spanning tree algorithm on the routing information to prevent any duplicate routes.

* * * * *